3,051,747
SYNTHESIS OF ACRYLIC ACIDS

Joel M. Leathers and George E. Woodward, Freeport, Tex., assignors to The Dow Chemical Company, Midland, Mich., a corporation of Delaware
No Drawing. Filed Mar. 27, 1958, Ser. No. 724,267
6 Claims. (Cl. 260—526)

This invention relates to the synthesis of acrylic acids and more particularly provides an improved process whereby such acids may be produced from readily available materials.

Acrylic acids are widely used in the industry in the manufacture of various resins, polymers, and the like.

We have discovered that an alkanoic acid having an alpha methylene group may be caused to react with formaldehyde to form, directly, the corresponding acrylic acid. More particularly the novel result is achieved by passing a solution of the acid and formaldehyde into contact with an alkali or alkaline earth metal hydroxide catalyst. This reaction may be represented by the following equation

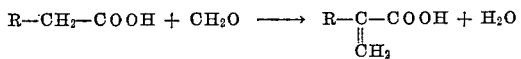

in which R represents hydrogen, or a lower alkyl radical. It is to be understood that the expression "lower alkyl" as hereinafter employed refers to alkyl radicals which contain from 1 to 5 carbon atoms, inclusive. The generic term "acrylic acid" is intended to include the alkylacrylic acids corresponding to the above formula.

The catalysts which have been found effective for the novel process are the alkali metal salts of carboxylic acids supported on inert absorbent material such as activated alumina. The catalyst is conveniently prepared by immersing the activated alumina in an aqueous alkali metal hydroxide, then filtering, and drying at about 110° C. This procedure provides a catalyst having a metal hydroxide content of about 3.2 percent by weight. The catalyst is developed by passing the alkanoic acid and formaldehyde over the catalyst until the effluent is acidic. Substantially any alkali metal hydroxide may be used in like manner to prepare catalysts which are operative in accordance with the present invention.

Alternatively, a solution of the desired alkali metal salt may be adsorbed directly onto an inert solid supporting material, in which case no development of the catalyst is necessary.

The temperature to which the catalyst, acid and formaldehyde are heated may vary somewhat but it has been found that good results are obtained at temperatures within the range of 300° to 500° C. and preferably between 350° C. and 400° C.

The formaldehyde may be employed in its pure form or as an aqueous solution. It is preferably introduced as an aqueous solution as for example at 30 to 32 percent aqueous solution. The ratio of formaldehyde to acid in the reaction mixture may be varied over a considerable range extending from about 0.1 to 10 moles of formaldehyde per mole of acid. Preferably, however, the molar ratio is from 0.5 to 3 moles of formaldehyde per mole of acid.

Similarly, the contact or residence time of the reactants in the catalyst bed is subject to considerable variation. However, it has been found that residence times of from about 20 to 100 seconds are within the commercially feasible range to give good results. However, residence times of from 1 to 200 seconds may be employed.

The following examples illustrate the present invention but are not to be construed as limiting.

Example 1

A 1 inch diameter 1.5 foot long tubular reactor packed with an activated alumina carrier impregnated with 3.2 percent by weight of sodium hydroxide was heated to 340° C. and maintained thereat throughout the reaction. A gaseous stream of reactants was fed to the top of the reactor at a rate of 0.01 liter per second. The reactant stream was composed of 19.4 percent formaldehyde, 47.8 percent propionic acid and 32.8 percent water. The effluent from the reactor after removal of the water by extraction with ether and stripping, analyzed 95 percent diethylketone and 5 percent methacrylic acid.

Example 2

In a like manner Example 1 employing the same feed composition and feed rate but at a temperature of 350° C. there was obtained a reaction effluent which analyzed 89 percent diethyl ketone and 11 percent methacrylic acid.

Other alkanoic acids can be converted to the corresponding acrylic acid employing the process of the present invention. Thus, acetic acid, butyric acid, isovaleric acid, caproic acid and the like, will produce the corresponding acrylic acid, ethylacrylic acid, isopropylacrylic acid, butyl acrylic acid, etc., respectively.

We claim:

1. A process for the preparation of acrylic acids which comprises the steps of contacting an alkanoic acid containing 2 to 7 carbon atoms and having an alpha methylene group with formaldehyde in the presence of a catalyst comprising an alkali metal salt of the alkanoic acid supported on an inert absorbent bed at a temperature of from 300° to 450° C., and separating the acrylic acid from reaction effluent.

2. A process for the preparation of acrylic acids which comprises the steps of contacting an alkanoic acid containing 2 to 7 carbon atoms and having an alpha methylene group with formaldehyde in the presence of a catalyst comprising an alkali metal salt of the alkanoic acid supported on an alumina bed at a temperature of from 300° to 450° C., and separating the acrylic acid from the reaction effluent.

3. A process as set forth in claim 1 wherein the alkanoic acid is propionic acid.

4. A process as set forth in claim 1 wherein the alkanoic acid is acetic acid.

5. A process as set forth in claim 1 wherein the alkanoic acid is butyric acid.

6. A process as set forth in claim 1 wherein the alkali metal salt is the sodium salt.

References Cited in the file of this patent

UNITED STATES PATENTS 2,697,729    Ohlson et al. _____ Dec. 21, 1954

FOREIGN PATENTS 847,370    France _____ June 26, 1939